Jan. 2, 1968 F. T. ROBERTS 3,361,379

TAPE REEL

Filed Sept. 6, 1966

FRED T. ROBERTS
INVENTOR.

BY [signature]
ATTORNEY.

3,361,379
Patented Jan. 2, 1968

1

2

3,361,379

TAPE REEL

Fred T. Roberts, Buena Park, Calif., assignor to Clary Corporation, San Gabriel, Calif., a corporation of California Filed Sept. 6, 1966, Ser. No. 577,344
1 Claim. (Cl. 242—74)

ABSTRACT OF THE DISCLOSURE

A tape reel having a first hub adapted to fit over a supporting shaft and being integral with a side flange, a second hollow hub concentric with the first and of larger diameter, said second hub being integral with said side flange, and a second side flange integral with said second hub and having a radial slot extending to the annular slot existing between the inner and outer hubs.

This invention relates to reels and has particular reference to supply and takeup reels to receive strips of relatively narrow tape or the like, such as paper tape, magnetic tape, inked ribbon, film, etc.

As is well known, it is generally difficult to attach the leading edge of a relatively narrow tape or the like to the hub of a reel on which the tape is to be wound, especially where the reel includes side flanges. For this reason, a number of different devices have been presented in the past for facilitating attachment of the tape to the hub but all that I am aware of have certain drawbacks which are overcome by the present invention. For example, in certain prior reel constructions, the hub of the reel does not fit directly over the supporting and/or drive spindle therefor but is made large enough in diameter to permit a loop formed in the leading edge of the tape to be anchored at a point between the spindle and the inside diameter of the reel hub. Although this construction works generally satisfactorily, it requires the spindle to support the reel solely by central bearings in the relatively thin side flanges of the reel. In such case, the bearings tend to wear after repeatedly mounting the same on the spindle and any looseness between the bearings and the spindle will permit the reel to wobble during rotation. Also, such construction requires the hub to be made relatively large in diameter, thereby decreasing the amount of tape that could otherwise be wound on the reel. In other reel constructions, one or more radial slots are provided in the reel hub and at least one of its side flanges to permit the leading end of the tape to be fitted over the supporting reel spindle. This construction results in a relatively weak reel construction and prevents the tape from being manually wound on the reel while the latter is off its spindle.

It therefore becomes a principal object of the present invention to provide a reel for tape or the like which facilitates attachment of the tape thereto and wherein the hub thereof fits directly on the supporting spindle.

Another object is to provide a reel of the above type wherein the reel hub fits directly on the supporting spindle and the tape may be threaded laterally through a slot in the side flange to mount the same.

Another object is to provide a reel of the above type which may be made of one-piece molded construction.

Another object is to provide a reel of the above type which is inexpensive to manufacture.

The manner in which the above and other objects of the invention are accomplished will be readily understood on reference to the following specification when read in conjunction with the accompanying drawing, wherein.

Figure 1:
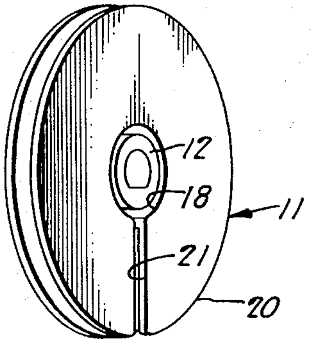
FIG. 1 is a perspective view of a reel embodying a preferred form of the present invention.
Figure 2:
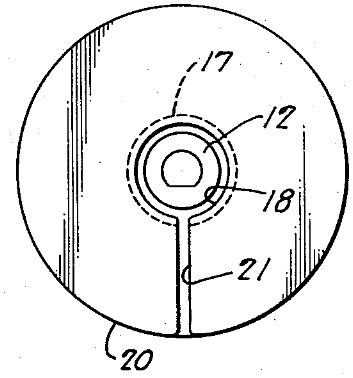
FIG. 2 is a front view of the reel.
Figure 3:
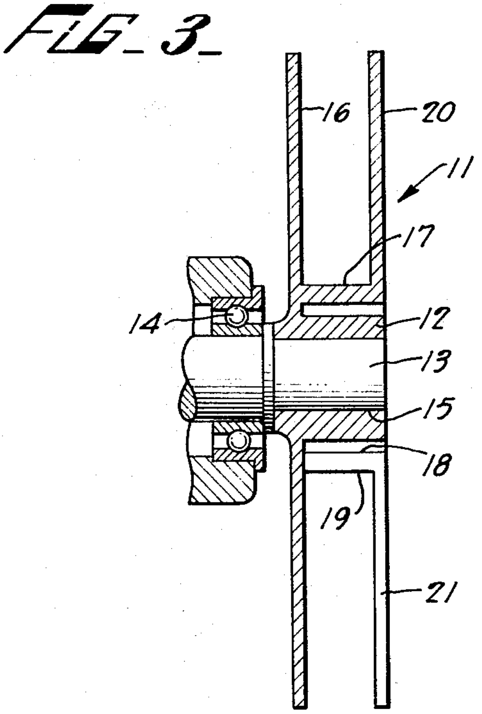
FIG. 3 is a sectional view through the reel and a mount therefor.

Referring to the drawing, the reel, generally indicated at 11, comprises a solid annular hub 12 which is slideably mountable directly on a spindle 13. The latter is rotatably supported by ball bearings, one of which is shown at 14. The spindle is flattened at 15 to fit against a mating face in the hub and thus form a driving connection for transmitting rotation to the reel.

The hub 12 is integral at one end thereof with a circular side flange 16. A sleeve or second hub 17, concentric with the inner hub 12, is also formed integral with the side flange 16 at one end and is spaced from the hub 12 to form a circular slot 18. The second hub 17 is integral at its opposite end with a second side flange 20.

A threading slot 21 is formed in the side flange 20 and extends radially from the outer periphery thereof to the circular slot 18, there being a coextensive slot 19 formed in the hub 17.

Figure 4:
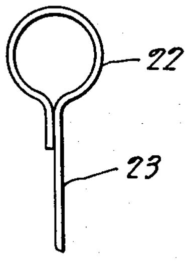
FIG. 4 is a side view of one form of tape having a looped end which can be mounted on the reel.

The tape to be wound on the reel may have either a looped end, as shown at 22 (FIG. 4), or a free end. In the case of a looped end tape, the loop is slid laterally into the circular slot 18 and the outer portion of the leading end of the tape, i.e., 23, is likewise slid laterally through the threading slot 21. Subsequent rotation of the reel will cause the tape to wind onto the outer hub 17.

If the tape has a free end, such free end is merely slid laterally through both the radial slot 21 and at least a portion of the circular slot 18, thereby binding the same against one side of the slot 18 to enable the tape to be wound on the hub 17.

It will be noted that the reel 26 may be molded in one piece of plastic or the like and that the hub 12 is solid, without any slots therein, thereby resulting in a rigid reel and insuring a firm connection to the spindle 13.

A basic advantage of the reel construction disclosed herein is that the tape may be wound onto the reel when the reel is either mounted on the spindle 13 or when the reel is removed from the spindle and is held by hand. Also, the hub 17 on which the tape is wound is maintained at a minimum diameter so that a maximum amount of tape may be wound onto the reel.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A reel for tape or the like comprising a first hollow hub, a side flange integral with said hub adjacent one end of said hub, a second hollow hub extending over said first hub and concentric with said first hub, said second hub being integral with said flange adjacent one end of said second hub whereby to form a curved slot between said first and second hubs, and a second side flange integral with said second hub adjacent the opposite end of said second hub, said second flange terminating radially inwardly at said second hub, said second flange having a slot therein extending at least substantially radially from said curved slot to the outer periphery of said second flange, and said second hub having a longitudinally extending slot therein communicating with said radial slot.

References Cited

UNITED STATES PATENTS

| | | | |
|---|---|---|---|
| 2,189,547 | 2/1940 | Fischer | 242—74 X |
| 2,954,941 | 10/1960 | Hultgren | 242—74 |

STANLEY N. GILREATH, *Primary Examiner.*

N. L. MINTZ, *Assistant Examiner.*